United States Patent Office 2,751,927
Patented June 26, 1956

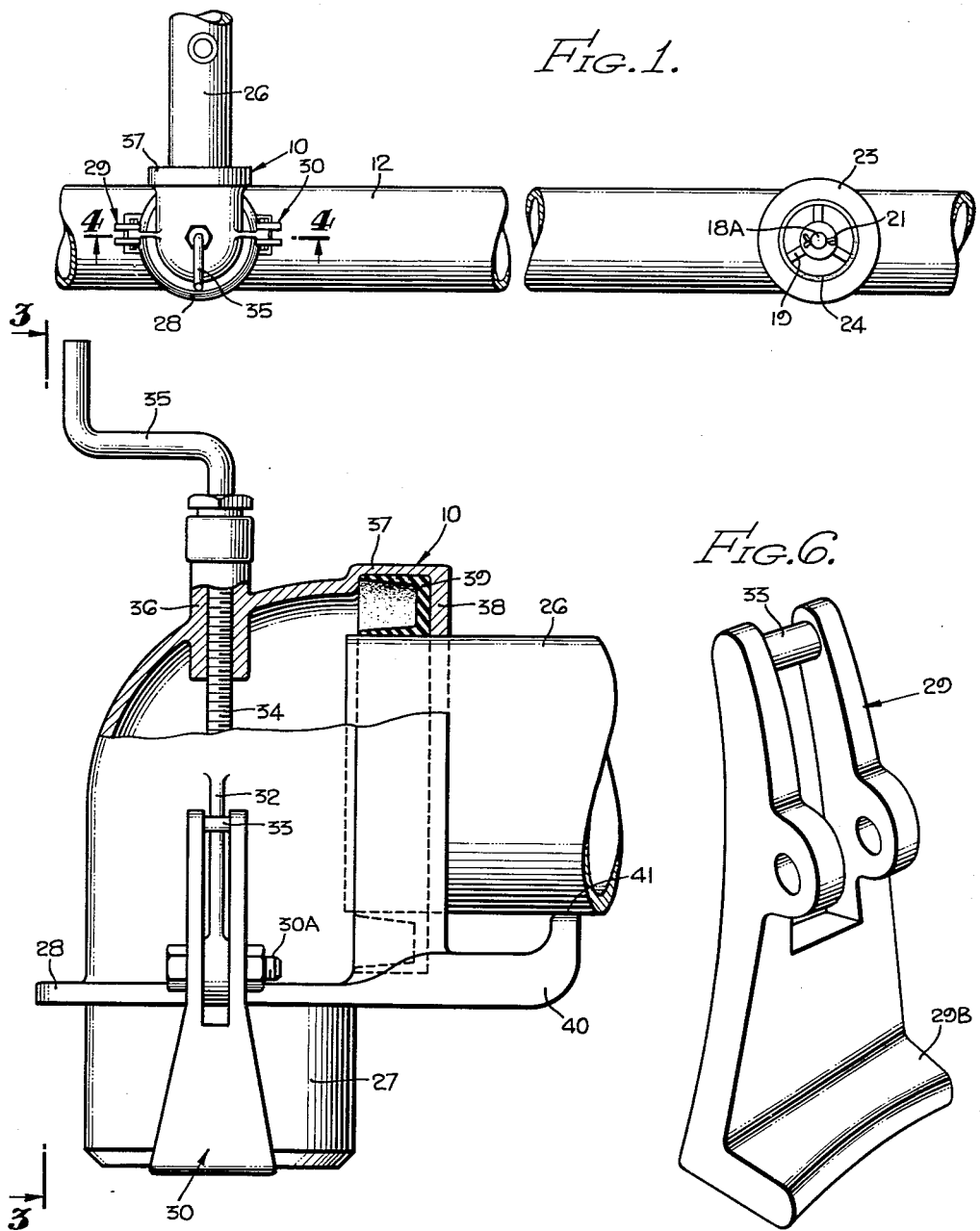

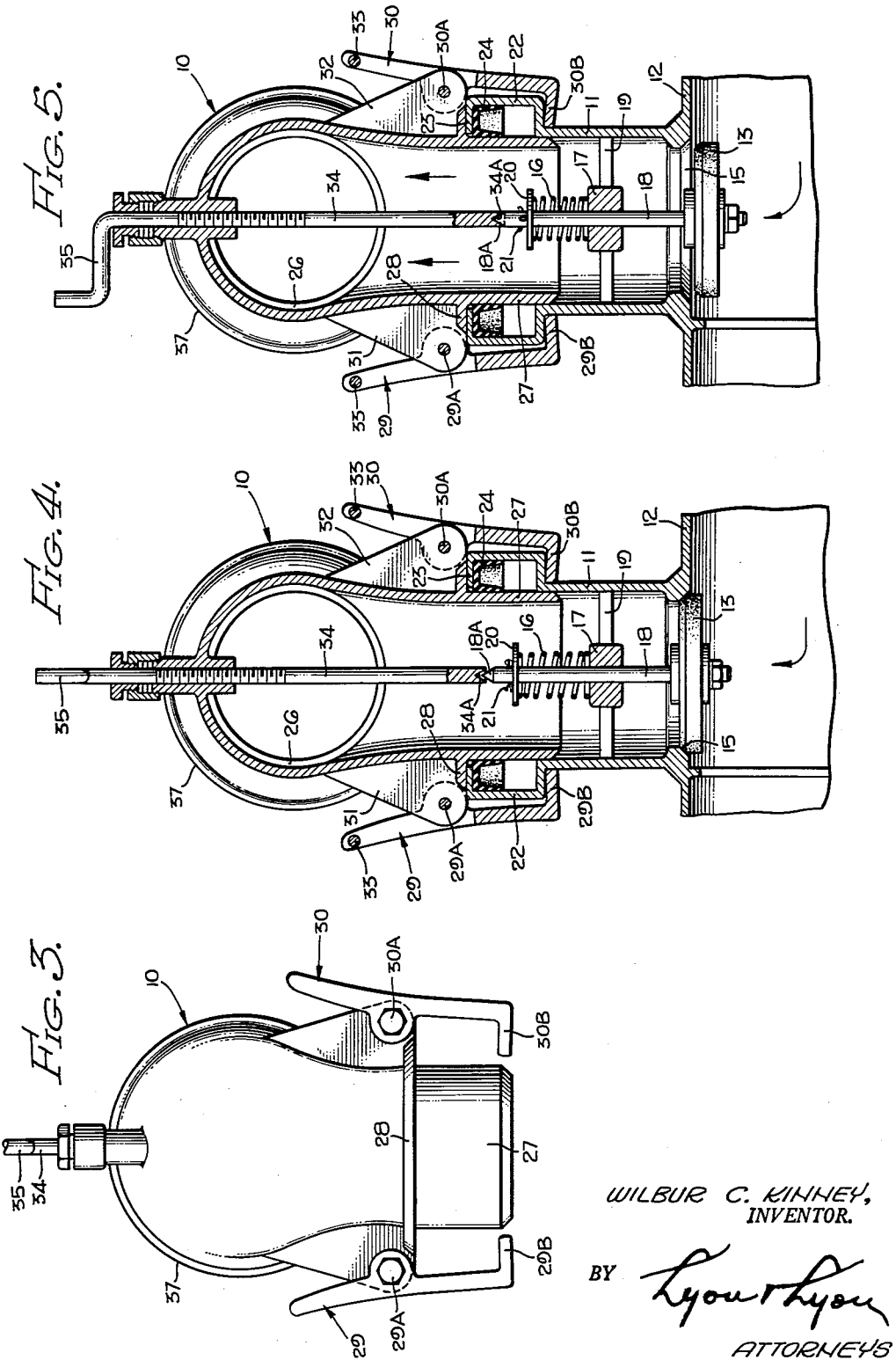

2,751,927

VALVED COUPLING ARRANGEMENT

Wilbur C. Kinney, Vista, Calif.

Application November 6, 1951, Serial No. 255,076

3 Claims. (Cl. 137—322)

The present invention relates to an improved coupling arrangement, fitting or 90° elbow which incorporates valve actuating means, although it will be understood from the following description that certain features of the present invention may be incorporated in fittings having other angularity than 90°.

An object of the present invention is to provide an improved pipe coupling element which incorporates valve actuating means.

Another object of the present invention is to provide an improved coupling element of this character featured by the quickly attachable and detachable connections which orient and position a valve actuating member in operative position.

Another object of the present invention is to provide an improved coupling element of this character which is quickly attachable and detachable and allows adjustment of the angularity between the axis of a supply line and the axis of a feed pipe in communication with the outlet of said coupling element.

Another object of the present invention is to provide an improved coupling element of this character which remains effective for its intended purpose even though the coupling element is swung in different oriented directions with respect to the supply line to which it is coupled.

Another object of the present invention is to provide an improved coupling element of this character which, when placed in coupling position, serves automatically to provide a seal between a supply line and the coupling element, as well as to open a valve to allow the escape of water into the coupling element.

Another object of the present invention is to provide an improved coupling arrangement of this character which, at the option of the operator, may be used to automatically turn on the flow of water upon establishment of a fluidtight coupling connection.

Conversely, another object of the present invention is to provide an improved coupling arrangement of this character wherein the flow of water is automatically interrupted upon decoupling elements of the arrangement.

Another object of the present invention is to provide an improved coupling arrangement of this type characterized by its ruggedness, inexpensiveness and simplicity of operation.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a top plan view of a length of water supply pipe with improved coupling means embodying features of the present invention;

Figure 2 is a view in side elevation and partly in section of one of the coupling elements shown in Figure 1 detached from the water supply line but with the auxiliary feed tube inserted in the outlet opening thereof;

Figure 3 is a view in end elevation taken substantially as indicated by the line 3—3 in Figure 2;

Figure 4 is a sectional view taken substantially as indicated by the lines 4—4 in Figure 1 and with the valve shown in its normally closed position;

Figure 5 is a sectional view corresponding to the sectional view shown in Figure 4 but with the valve moved to open position; and Figure 6 is a perspective view of one of the pivoted long arm hooks incorporated in the coupling element shown in Figure 3.

The coupling element 10 (Figures 2 and 3) is adapted to cooperate with a water outlet tube 11 (Figure 4) on the water supply line 12, which has a plurality of such outlet tubes 11 as indicated in Figure 1. The tube 11 is normally closed off from the internal bore of the supply line 12 by means of the movable normally closed valve element 13, the peripheral edge of which cooperates for that purpose with the annular valve seat 15, which is an integral part of the pipe 12. The valve element 13 is normally maintained in such closed position by the coil compression spring 16, which has its lower end abutting the stationary hub 17 through which the movable valve stem 18 is free to move. This hub 17 is joined to the cylindrical wall of the tube 11 by means of a perforated web 19. The upper end of the valve stem 18 carries a washer 20. The prestressed spring 16 moves the washer 20 upwardly into engagement with the cotter pin 21. By this construction it is evident that the valve element 13 is normally seated and prevents the escape of water from the pipe 12.

The upper end of the tube 11 is formed with an enlarged annular hub 22, the upper end of which carries an integrally formed annular ring 23. An annular chevron type of resilient gasket 24 is disposed within the hub 22 and is prevented from leaving the same by the ring 23. The outer wall of the chevron gasket 24 resiliently presses the internal wall of the hub 22, while the internal annular wall of the gasket 24 is adapted to resiliently press a tubular portion of the coupling element 10 now described in detail.

In general, the coupling element 10 serves to provide means for moving the valve element 13 to open position and for providing conduit means for one end of a feed pipe 26, and such that the axis of such feed pipe 26 may assume different angular positions with respect to the axis of the supply pipe 12. The coupler 10 is cast, forged or machined in the form of a 90° elbow, with a straight tubular end 27 adapted to be inserted into the annular hub 22 so as to resiliently engage the inner annular wall of the chevron gasket 24, so as to provide a watertight seal between these elements. The depth of penetration of the tubular end 27 is limited by engagement of the stop ring 28 mounted thereon with the ring 23.

In order to lock the coupling element 10 to the line 12, the coupling element 10 carries a pair of diametrically oppositely disposed pivoted levers 29, 30. These levers 29, 30 are pivoted by means of pivot pins 29A, 30A, respectively, to radially outwardly extending arms 31, 32, respectively, the lower ends of such levers 29, 30 being formed with hooks 29B, 30B, respectively, which are adapted to engage the under side of the annular hub 22. The upper ends of the levers 29, 30 are bifurcated as shown in Figure 6 with a pin 33 joining the bifurcated portions to provide a conventional handle. These levers 29, 30 are gravity actuated, i. e., gravity forces thereon maintain these elements in the locked position shown in Figure 4.

It is noted that this locking arrangement thus provided while preventing movement of the coupling element 10 longitudinally along the axis of the tubular portion 27, allows rotation about such axis whereby the feed tube 26 inserted in the outlet opening of the coupling element 10, as shown in Figure 2, may be oriented in different angular positions with respect to the axis of the feed line 12.

For purposes of actuating the valve element 13, coupling element 10 screw-threadedly mounts a screw threaded manually operated rod 34 which has an integrally formed manually operated crank 35 at its upper end, as shown in Figure 2. This rod 34 extends coaxially with the axis of the tubular portion 27 and has its lower end formed with a conical recessed portion 34A for alignment and engagement with the conical shaped end 18A of the movable valve stem 18. The rod 34 is screw threaded in the threaded bushing 36 of the coupling element 10, so that upon rotating the rod 34, using the crank 35, the valve stem 18 may be moved downwardly from its position shown in Figure 4 to its position shown in Figure 5, for purposes of moving the valve element 13 to open position as indicated. It is obvious that, because of the coaxial arrangement of the rod 34 with respect to the tubular portion 27, the rod 34 remains in valve opening position regardless of which direction the feed pipe 26 (Figures 1 and 2) is oriented.

Various means may be used to couple and to provide a seal between the coupling element 10 and the feed pipe 26, and the particular means shown herein is preferred. For this purpose the coupling element 10 has its outlet opening defined by the enlarged hub 37 which has the integrally formed ring 38. A chevron type gasket 39 is retained by such ring 38 with the inner annular wall of the gasket engaging the feed pipe 26, and with the outer annular wall of gasket 39 resiliently engaging the hub 37 to provide a watertight seal. The annular stop 38 previously described and shown in Figure 2 is provided with an integrally formed extension 40 with a recessed extremity 41 adapted to engage the pipe 26 for purposes of supporting the same.

Once the valve operating rod 34 is turned to a position wherein it is effective to move the valve element 13 to open position, it is obvious that the coupling element may be removed without first turning the rod 34 to valve closing position. In other words, assuming the relationship of parts shown in Figure 5, it is obvious that the coupling unit 10 may be removed from the outlet tube 11 by simply moving the upper ends of the levers 29, 30 inwardly, in which case the prestressed spring 16 acts in such a direction to move the operating rod 34 and coupling element 10 upwardly.

Conversely, assuming that the coupling element 10 is completely separated from the outlet tube 11, but the operating rod 34 is screwed all the way downwardly, then upon insertion of the tubular portion 27 into the annular hub 22, a seal is automatically provided by the gasket 23 and simultaneously the valve 13 is moved to open position.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A coupling arrangement of the character described for use with a supply line having an outlet tube thereon with a valve element movably mounted in said tube, and with a cooperating valve seat for said valve element near the throat of said tube and with resilient means acting on said valve element to maintain the same in normally closed position and with said outlet tube having an enlarged annular continuous hub near the open end thereof with a generally U-shaped cross section, said coupling element including the combination of a tubular portion for insertion projecting into said outlet tube, a pair of gravity actuated hooks pivotally mounted on said coupling element at diametrically opposite regions, said hooks having their lower ends formed for engaging the under side of said enlarged hub, said hooks being so formed and weighted that their free ends are relatively close to said tubular portion and are required to be pivoted away from said tubular portion to allow said tubular portion to be inserted into said outlet tube, a valve actuating member on said coupling element extending generally perpendicular to the plane of said annular hub for moving said valve element against the action of said resilient means, said resilient means being effective, when said actuating member is in valve open position, to press said hooks into engagement with said annular hub.

2. A coupling element for use with an outlet tube, said coupling element having a tubular inlet portion, stop means in the form of an annular flange mounted on said coupling element and extending outwardly of said tubular portion, a pair of hooks pivoted on said coupling element adjacent to said stop means with their free hooking ends terminating substantially at the inlet end of said tubular portion, said hooks being so formed and weighted that their free ends are relatively close to said tubular portion and are required to be pivoted away from said tubular portion to allow said tubular portion to be inserted into said outlet tube, a valve actuating rod having its axis coaxial with the axis of said tubular portion and substantially perpendicular to the plane of said flange, means adjustably supporting said actuating rod on said coupling element.

3. In combination, a supply line having an outlet tube with the end of said tube having an enlarged annular continuous hub, said supply line having spring pressed valve means normally closing said supply line, a coupling element comprising a 90° elbow having a tubular portion extending into said outlet tube, flange means on said coupling element engageable with said enlarged hub to limit movement of said coupling element in said outlet tube, a pair of hooks pivoted on said coupling element extending around said annular continuous hub and engaging the under side thereof, said hooks being so formed and weighted that their free ends are relatively close to said tubular portion and are required to be pivoted away from said tubular portion to allow said tubular portion to be inserted into said outlet tube, valve actuating means mounted on said coupling element comprising a rod which extends generally parallel to one leg of said coupling element and substantially perpendicular to the plane of said annular continuous hub, said spring-pressed valve means being effective to press the free ends of said hooks against the underside of said hub.

References Cited in the file of this patent

UNITED STATES PATENTS

| 277,872 | Boone | May 22, 1883 |
| 797,384 | Thurston | Aug. 15, 1905 |
| 1,150,420 | Davis | Aug. 17, 1915 |
| 1,253,309 | Ulleland | Jan. 15, 1918 |
| 1,836,133 | Rosewood | Dec. 15, 1931 |
| 1,991,343 | Ball | Feb. 12, 1935 |
| 2,034,933 | Wilson | Mar. 24, 1936 |
| 2,370,354 | Hurst | Feb. 27, 1945 |
| 2,464,466 | Stout | Mar. 15, 1949 |
| 2,527,644 | Moulton | Oct. 31, 1950 |
| 2,528,369 | Jensen | Oct. 31, 1950 |
| 2,543,589 | Newcomb | Feb. 27, 1951 |
| 2,589,321 | Anderson | Mar. 18, 1952 |
| 2,620,817 | Blaydes | Dec. 9, 1952 |
| 2,627,429 | Engleman | Feb. 3, 1953 |
| 2,696,993 | Buckler | Dec. 14, 1954 |

FOREIGN PATENTS

| 118,269 | Australia | Mar. 13, 1944 |